Dec. 25, 1962 T. P. COTE ETAL 3,069,928
DIFFERENTIAL ASSEMBLY
Filed Oct. 1, 1959 2 Sheets-Sheet 1

INVENTORS
Thomas P. Cote, &
BY Edward L. Nash

L. D. Burek
ATTORNEY

Dec. 25, 1962   T. P. COTE ETAL   3,069,928
DIFFERENTIAL ASSEMBLY
Filed Oct. 1, 1959   2 Sheets-Sheet 2

INVENTORS
Thomas P. Cote, &
BY Edward L. Nash
L. D. Burch
ATTORNEY

United States Patent Office 3,069,928
Patented Dec. 25, 1962

3,069,928
DIFFERENTIAL ASSEMBLY
Thomas P. Cote, Warren, and Edward L. Nash, Ferndale, Mich., assignors to General Motors Corporation, Detroit, Mich., a corporation of Delaware
Filed Oct. 1, 1959, Ser. No. 843,684
3 Claims. (Cl. 74—713)

This invention relates to differential assemblies for motor vehicles and more particularly to a differential housing having means for adjusting the assembly to eliminate or limit gear backlash.

In some motor vehicle designs it is desirable to provide a differential unit of compact construction in order to place the differential unit in a limited spaced provided by the styling of the vehicle. One way of reducing the overall size of a differential assembly is to place the crosspin, differential gear and side gear assembly within the annulus formed in the ring gear.

In constructions of this kind, little or no provisions are made for eliminating or limiting gear backlash in such a manner as to provide continuous adjustment thereof during the life of the unit, in case of bettering or worsening gear lash conditions. In the generally available differential unit of this nature, half axle shafts are fitted into the differential unit upon assembly thereof and shims, or the like, suitably placed to properly space the parts and limit gear backlash. Obviously, with these constructions, the assembly procedure is very cumbersome, time consuming and expensive. It is also to be noted that the cost of the unit is high because of the great amount of precision, the great number of parts, and the amount of labor necessary in manufacturing and assembling the parts.

With differential units of this type, excessive backlash causes vibration and noise within the differential unit which is objectionable to the vehicle operator and at the same time substantially decreases the fatigue life of the assembly.

The device in which this invention is embodied comprises a differential unit having a carrier and ring gear rotatably mounted within a housing, and a drive pinion engaging the ring gear to transmit driving torque from a drive shaft connected to the pinion to the axle shafts, attached to the differential side gears in the usual manner. The carrier is supported on bearing assemblies which in turn are secured by bearing adjusting sleeves in the side walls of the housing. The bearing adjusting sleeves are adaptable to be moved inwardly and outwardly relative to the carrier and the housing in order to limit or eliminate gear backlash. A similar construction is provided for the drive pinion shaft.

The resulting assembly is one of relative simplicity as compared to the usually available structure. The device is economical to manufacture and presents no undue assembly problems, either in the assembly of the parts themselves or in the adjustment thereof. The use of shims and the like is practically eliminated, thus saving considerable time and expense required for fitting the proper shims in the proper place. The bearing adjusting sleeves, being adjustable from outside the housing, provide for continued adjustment, if necessary, in the case of wear or working-in of the parts during the life of the differential unit. It is unnecessary to completely dismantle the assembly in order to adjust for backlash.

These advantages result in a differential unit which is relatively inexpensive to manufacture and assemble, has a longer life and does not present the problems incident to gear backlash, namely, vibration, noise, and parts damaged.

These and other advantages will become more apparent from the following description and drawings in which.

Figure 1:
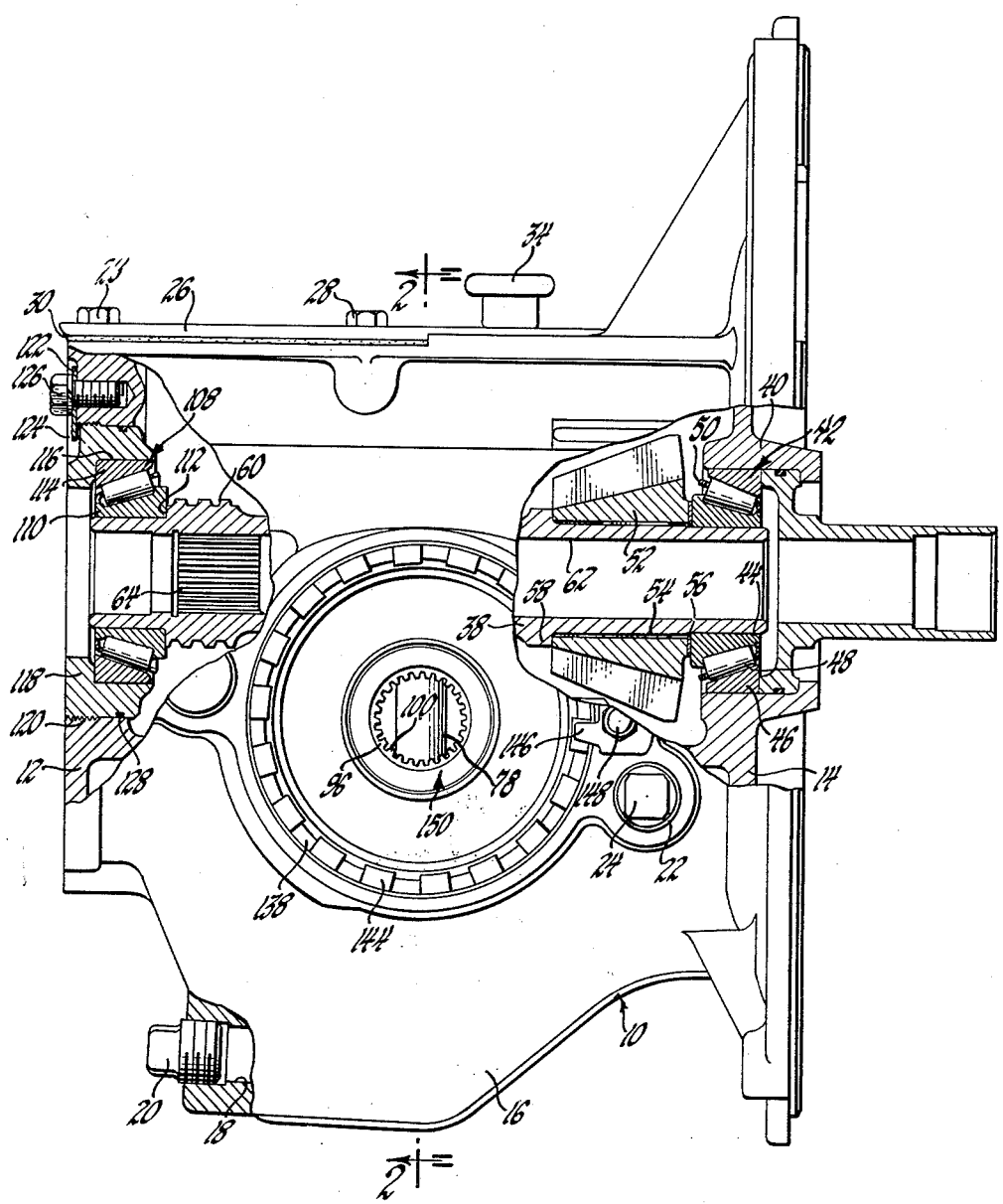
FIGURE 1 is an elevational view of a differential unit with parts broken away and in section to illustrate the positions of the various parts.

Referring more particularly to the drawings, the differential unit may be seen to be completely enclosed by a casing or housing illustrated generally by the numeral 10. The housing is made up of a box having an end wall 12 which may be attached to the vehicle transmission, and an opposite end wall 14 which may be attached or form a part of the vehicle clutch housing. An oil sump 16 depends downwardly from the main portion of the housing 10 and has a drain hole 18 and a drain plug 20 in the proper position for emptying the oil, or other lubricant, that may be placed in the assembly. In order to refill the sump, a suitable opening 22 and filler plug 24 are provided above the normal level of lubricant in the oil sump 16.

A sheet metal cover 26 closes the housing at the upper side, the cover being secured to the housing by a plurality of bolts 28 threadedly received in the housing itself. A gasket 30 may be supplied between the cover and housing to properly seal the opening. Depending on the construction of the cover 26, it may be necessary to provide strengthening ribs 32 therein in some suitable pattern. A vent 34 may be provided in the cover 26 in order to provide proper ventilation of the interior of the unit.

The housing 10 may also be provided with strengthening ribs, as at 36, depending on the construction thereof. If the housing is made of sheet metal, or the like, or some relatively thin wall material, strengthening ribs would probably be necessary. On the other hand, if the housing 10 were constructed of heavy thicker material, the ribs 36 would be unnecessary.

Extending longitudinally through the housing 10, and lengthwise of the vehicle, is a pinion shaft 38 journaled in the transmission end in a manner to be later described, and journaled at its opposite end in a hub 40 formed in the end wall 14 of the housing 10. A bearing assembly, illustrated generally by the numeral 42, is disposed between the hub and the shaft 38. The bearing assembly 42 may take any form suitable for the support required, and is illustrated as being a tapered roller bearing having an inner race 44, an outer race 46 and an annulus of tapered rollers 48. A bearing cage 50 may also be provided in order to properly space the roller bearings between the bearing races.

The pinion shaft 38 has a differential drive pinion 52 mounted thereon in some suitable manner, as by a key or by splines, as illustrated at 54. The pinion 52 may abut the inner bearing race 44 or may be separated therefrom by a spacer member or shim 56, the other end of the pinion being located by a land 58 formed on the pinion shaft 38. This enables the proper placing of the drive pinion 52 with respect to the remainder of the differential assembly.

The opposite end of the pinion shaft 38 is provided with a gear section 60 which serves as a speedometer drive gear. The gear 60 is an integral part of the pinion shaft and is adapted to drive the remainder of the speedometer assembly, which is not shown, through suitable gearing connections.

The pinion shaft 38 is provided with a bore 62 completely therethrough, to receive the driving shaft from the vehicle transmisison located adjacent the differential unit and to the left as viewed in FIGURE 1. The transmission output shaft (not shown) actuates the pinion shaft 38 through the internal splines 64, which mesh with suitable external splines in the transmission output shaft.

Figure 2:
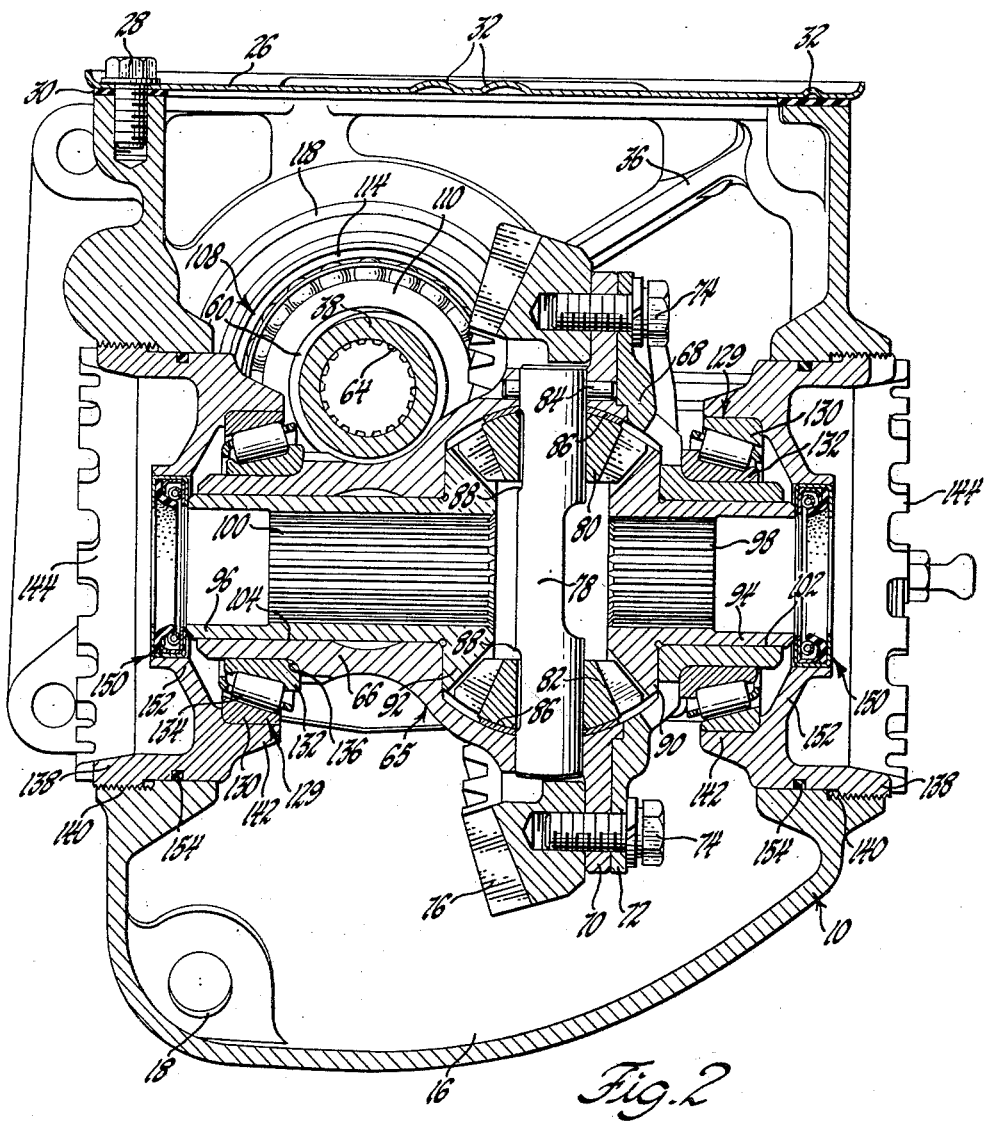
FIGURE 2 is a cross-sectional view of the device illustrated in FIGURE 1, taken substantially along the line 2—2 and looking in the direction of the arrows.

The interior assembly of the differential unit is best illustrated in FIGURE 2. A carrier, indicated generally by the numeral 65, comprises two pieces, indicated by numerals 66 and 68, having abutting flanges 70 and 72 respectively. The flanges are joined together by a series of bolts, indicated generally by the numeral 74. The carrier is journaled in the side walls of the housing in a manner to be later described. A ring gear 76 is secured to the carrier flanges 70 and 72 by the same bolts 74, and is adapted to engage the drive pinion 52 in the usual manner.

Disposed within the ring gear and through the carrier portion 66 is a crosspin 78 having mounted thereon a pair of differential gears 80 and 82. The crosspin 78 is secured in the carrier portion 66 by a dowel pin 84 which prevents rotation of the pin and prevents the pin from sliding out of the carrier during the assembly procedure. The differential gears 80 and 82 are rotatable on the crosspins 78 and are separated from the carrier portion 66 by bearing plates 86. The inward movement of the differential gears 80 and 82 is limited by shoulders 88 formed on the central portion of the crosspin 78.

The differential gears 80 and 82 are so positioned as to engage differential side gears 90 and 92 which extend at right angles with respect to the pinion shaft. The differential side gears 90 and 92 are integrally formed on the ends of hollow shaft members 94 and 96, the shaft members being adapted to receive the half axle shafts (not shown) leading to the road wheels. Suitable splines 98 and 100 formed within the shafts 94 and 96 respectively, provide positive rotation of the axle shafts along with the differential side gears 90 and 92.

The shafts 94 and 96 rotate with the carrier portions 66 and 68 during normal operation of the differential unit and are adapted to rotate relative therto along the bearing surfaces 102 and 104 when it is necessary for the road wheels to rotate at different speeds. This, of course, is the usual operation of a differential assembly.

Referring again to FIGURE 1, the manner in which the left-hand end of the drive pinion shaft 38 is journaled in the end wall 12 of the housing 10 is best illustrated. A suitable bearing assembly 108, which may be a tapered roller bearing assembly such as that previously described and indicated by the numeral 42, or which may be of any other suitable construction, has an inner race 110 received about the end of the pinion shaft 38 and located thereon by the shoulder 112 formed by the end of the speedometer drive gear 60. The outer race 114 is secured in an annular recess 116 formed in a bearing adjusting sleeve 118.

The bearing adjusting sleeve is threadedly received in the end wall 12 of the housing, as at 120, such that in and out position of the sleeve 118 may be varied. It may be seen that by rotating the sleeve 118 in the proper direction, the entire pinion shaft 38 and bearing assemblies 42 and 108, as well as the pinion 52, may be positioned lengthwise of the housing 10 to limit or eliminate gear backlash between the parts. Once the proper position has been set, the bearing sleeve 118 may be locked by a tab 122 receivable in a groove 124 in the sleeve 118 and secured to the housing end wall 12 by a bolt 126.

An O-ring seal or the like 128, received in a suitable groove in the sleeve 118, prevents the leakage of lubricant between the end wall 112 of the housing and the exterior threaded surface of the sleeve 118.

The manner in which the carrier 65 is journaled in the side walls of the housing 10 is best illustrated in FIGURE 2. A similar construction to that described with respect to the left-hand end of the drive pinion shaft 38 is employed to journal the carrier in the side walls of the housing.

The construction at both ends of the carrier 65 is essentially the same and the following description relates to the construction shown in the left-hand end of the carrier as viewed in FIGURE 2. Like reference numerals refer to like parts as between the right and left-hand ends of the carrier.

A suitable bearing assembly 129, which may comprise a roller bearing assembly having an outer race 130, an inner race 132, and an annulus of tapered rollers 134, is received about the end of the carrier portion 66 and located thereon by a shoulder 136. A bearing adjusting sleeve 138, threadedly received in the side wall of the housing 10 as at 140, has a nose 142 adapted to receive and locate the outer race 130 of the bearing assembly 128. As described with respect to bearing adjusting sleeve 118, the sleeve 138 may be rotated to advance or retract the sleeve with respect to the housing 10, thus moving the carrier inwardly or outwardly as required. The outer edge of the sleeve 118 is castellated, as at 144, to receive a lock tab 146 (FIGURE 1) secured to the housing 10 by a bolt 148 (FIGURE 1). The tab 146 prevents rotation in either direction of the sleeve 138 so that when the sleeve is properly adjusted it is securely retained in position.

In order to seal the half axle shaft, which extends into the hollow shaft 96, a seal assembly, illustrated generally by the numeral 150, is secured to an annular web 152 formed within the sleeve 138. In order to seal the adjoining surface between the sleeve 138 and the side wall of the housing 10, an O-ring, or other suitable seal, 154 is provided in a groove formed in the surface of the sleeve 138.

The operation of the differential unit is essentially the same as that of conventional differential constructions. The transmission output shaft (not shown), which is the input shaft to the differential unit, drives the pinion shaft 38 through the spline connection 64. The pinion 52 mounted on the pinion shaft 38 rotates the ring gear 76 and the carrier portions 66 and 68 which are secured to the ring gear. The crosspin and differential gears 78, 80 and 82, respectively, rotate with the carrier portions 66 and 68, the differential gears 80 and 82 being stationary with respect to the crosspin 78 under normal operating conditions. Thus, the differential side gears 90 and 92 and the half axle shafts (not shown) are rotated in the same direction to drive the road wheels. In the event that one road wheel, and consequently one of the differential side gears 90 or 92, must rotate relative to the opposite wheel and opposite differential side gear, the differential gears 80 and 82 are allowed to rotate about the crosspin 78 in order to take up the relative movement.

In the assembly and adjustment of the differential unit, the following procedure is followed: A sub-assembly is made of the carrier portions 66 and 68, the ring gear 76, the crosspin 78, the differential gears 80 and 82 and the differential side gears 90 and 92. This assembly is placed in the bottom of the housing 10 to permit placement of the pinion shaft 38 and the drive pinion 52. The shaft 38 is properly placed in its bearing 42 at the clutch end of the housing 10, and the front bearing adjusting sleeve 118, along with the bearing assembly 108, is mounted in position. The sleeve is tightened while the shaft 38 and the pinion 52 are rotated until a torque of 15 to 20 in. lbs. is obtained at the pinion shaft. The sleeve 118 is then locked in this position.

The sub-assembly comprising the ring gear, carrier, etc., is then lifted into position with respect to the pinion 52, and the two bearing sleeves and bearing assemblies 138 and 128 are installed in the side walls of the housing 10. The two bearing sleeves 138 are tightened until there is a slight preload on both bearing assemblies 128, and one of the sleeves is then adjusted until the gear set has zero backlash. The sleeve last adjusted is then backed off one notch and locked in that position by the tab 146 and bolt 148.

The torque required to rotate the differential assembly at a constant speed, with one adjusting sleeve loose enough to prevent bearing preload, is then determined.

The last mentioned sleeve is then tightened with the determined torque required to rotate the differential assembly increased by 15 to 20 in. lbs. This sleeve is then locked through a tab 146 and bolt 148.

Thus, it may be seen that a differential unit is provided which permits simple and positive adjustment in order to limit or eliminate gear backlash, and remain a differential unit of relatively inexpensive construction and simple assembly.

What is claimed:

1. A differential assembly for a motor vehicle comprising a housing, an input shaft extending through said housing, bearing means at each end of said housing and supporting said input shaft, a pinion gear mounted on said input shaft, a carrier mounted in said housing and transversely disposed with respect to said input shaft, an annular ring gear secured to said carrier and engaging said pinion gear, a crosspin and differential gear assembly mounted within said ring gear and rotatable therewith, side gears rotatably mounted in said carrier and engaging said crosspin and differential gear assembly and adapted to receive the axle shafts of said motor vehicle, a bearing adjusting sleeve threadedly received in each side of said housing and exposed to the exterior of said housing and concentrically disposed with respect to the adjacent ends of said carrier, seal means disposed between said adjusting sleeve and said housing to prevent escape of lubricant from said housing, a bearing assembly between each end of said carrier and said bearing adjusting sleeves, and lock means mounted externally on said housing to permit adjustment of said bearing adjusting sleeves to take up gear backlash between said pinion gear and said ring gear without disassembly of said housing.

2. In a motor vehicle, a differential assembly having a housing and a carrier mounted within said housing and a ring gear secured to said carrier and rotatable therewith and having a pinion gear meshing with said ring gear and driving said ring gear and said carrier and having a crosspin and differential gear and side gear assembly mounted in said ring gear and said carrier for transmitting driving torque to the axle shafts of said motor vehicle, ring gear to pinion gear backlash takeup means comprising a bearing assembly at each end of said carrier and adjacent opposite sides of said housing and accessible from outside said housing, a bearing adjusting sleeve threadedly received in each side of said housing and concentrically disposed with respect to the ends of said carrier, seal means disposed between said adjusting sleeve and said housing to prevent escape of lubricant therethrough, said bearing assemblies being disposed between said carrier and said sleeves to permit relatively frictionless rotation of one within the other, and lock means mounted on opposite sides of said housing and externally thereof and engaging said bearing adjusting sleeves to lock said sleeves in the proper backlash limiting position and permit external adjustment of said sleeves with respect to said carrier and in said housing.

3. In a motor vehicle differential assembly having a housing and a carrier rotatably mounted therein and a pinion shaft extending therethrough in a direction transverse to said carrier, ring gear to pinion gear backlash takeup and adjusting means comprising a bearing assembly mounted on each end of said carrier and on each end of said pinion shaft, lands formed on said carrier and on said pinion shaft for locating said bearing assemblies with respect thereto, bearing adjusting sleeves threadedly and sealingly received in opposite sides of said housing and in one end of said housing and concentrically disposed with respect to said carrier and said pinion shaft, each of said sleeves abutting one of said bearing assemblies and being adjustable with respect to said carrier to limit backlash, and lock means secured to said housing and externally thereof and engaging said sleeves to secure said sleeves in the properly adjusted position and to permit adjustment of said sleeves from the outside of said housing and without disassembly of said housing.

References Cited in the file of this patent

UNITED STATES PATENTS

| | | |
|---|---|---|
| 1,231,320 | Alden | June 26, 1917 |
| 1,242,803 | Herreshoff | Oct. 9, 1917 |
| 1,370,861 | Vanderbeck | Mar. 8, 1921 |
| 1,434,578 | Alden | Nov. 7, 1922 |
| 1,594,534 | Leister | Aug. 3, 1926 |
| 1,610,958 | Leister | Dec. 14, 1926 |
| 1,614,992 | Roberts | Jan. 18, 1927 |
| 1,671,682 | Norris | May 29, 1928 |
| 1,987,716 | Skelton | Jan. 15, 1935 |
| 2,277,369 | Achultz et al. | Mar. 24, 1942 |
| 2,408,926 | Griffith | Oct. 8, 1946 |

FOREIGN PATENTS

| | | |
|---|---|---|
| 341,205 | Great Britain | Jan. 15, 1931 |
| 1,111,379 | France | Feb. 27, 1956 |